Feb. 12, 1935.  V. A. ROHLIN  1,990,881
LIQUID DISTRIBUTION CONTROL MECHANISM FOR MULTIUNIT APPARATUS
Filed May 24, 1932   3 Sheets-Sheet 1
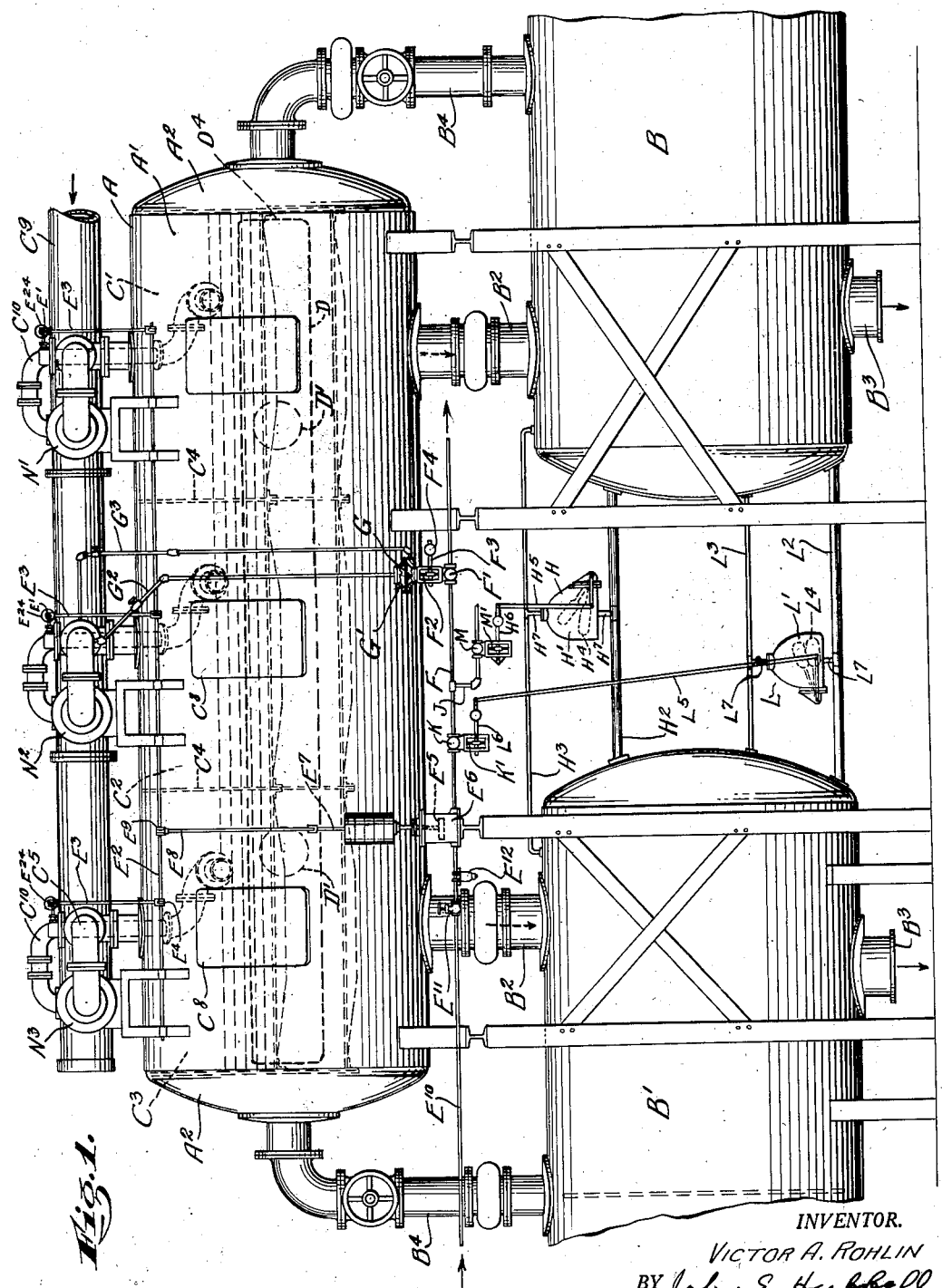
INVENTOR.
VICTOR A. ROHLIN
BY John E. Hubbell
ATTORNEY Feb. 12, 1935.   V. A. ROHLIN   1,990,881
LIQUID DISTRIBUTION CONTROL MECHANISM FOR MULTIUNIT APPARATUS
Filed May 24, 1932   3 Sheets-Sheet 2
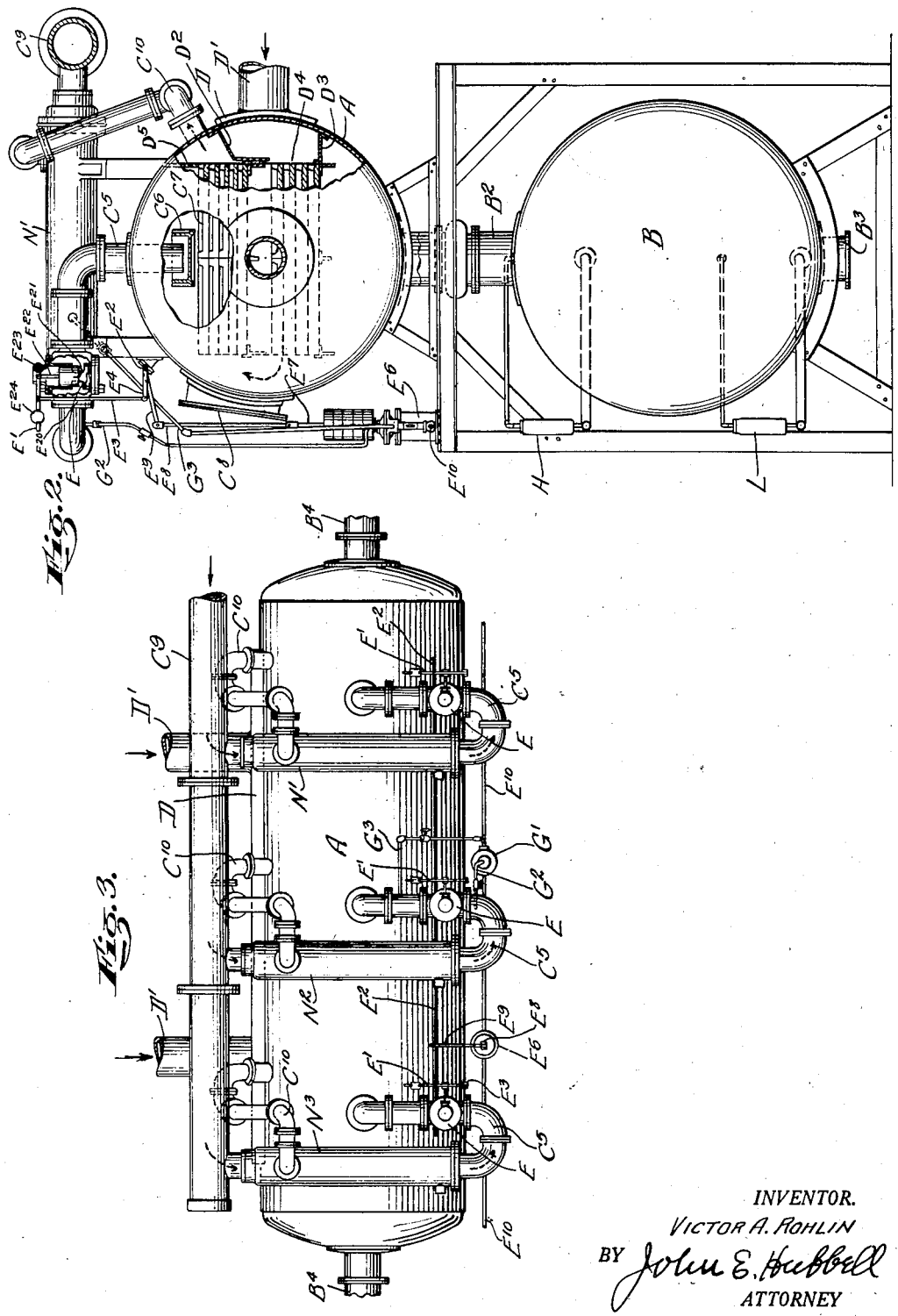
INVENTOR.
VICTOR A. ROHLIN
BY John E. Hubbell
ATTORNEY

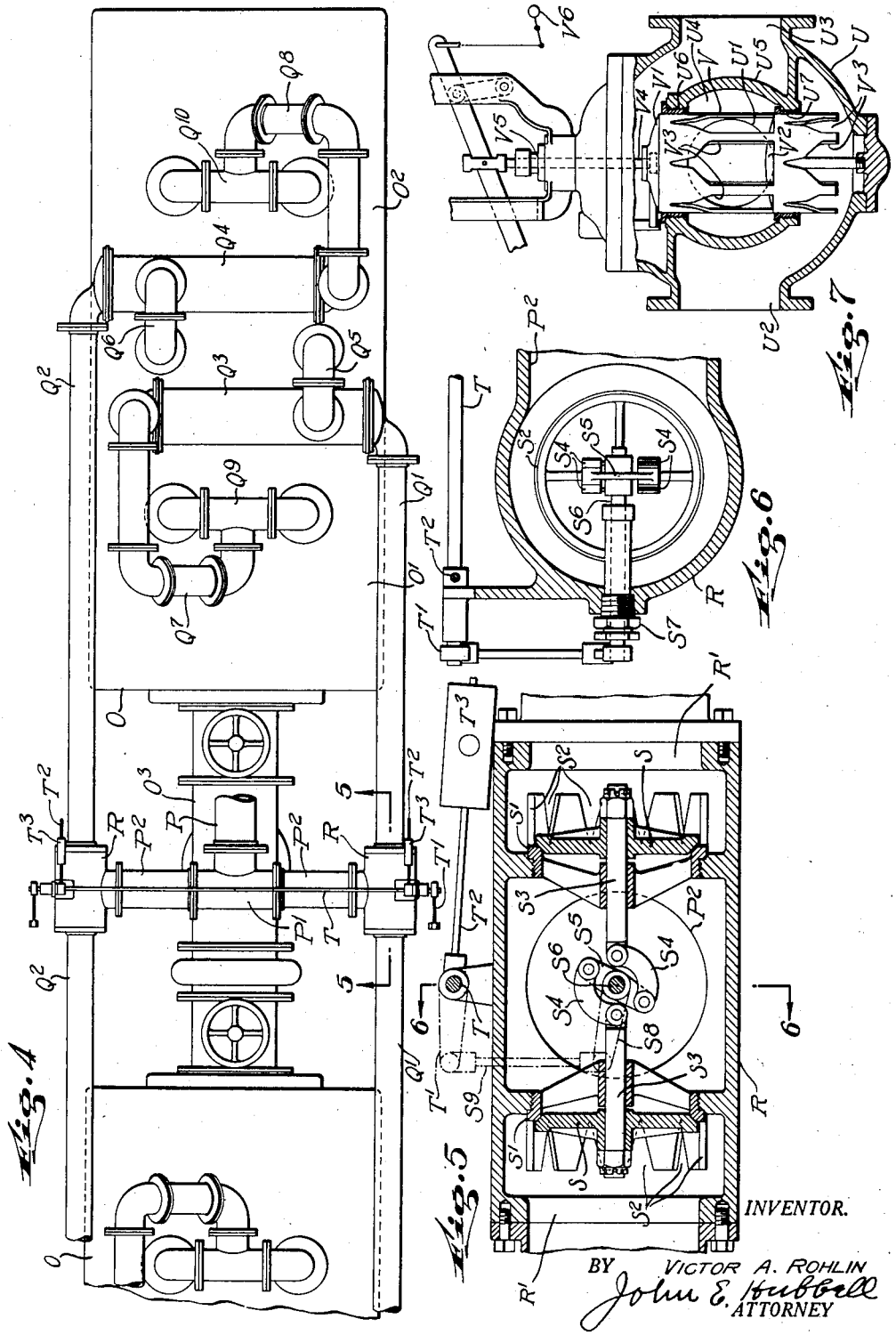

Patented Feb. 12, 1935

1,990,881

UNITED STATES PATENT OFFICE 1,990,881

LIQUID DISTRIBUTION CONTROL MECHANISM FOR MULTIUNIT APPARATUS

Victor A. Rohlin, Philadelphia, Pa., assignor to Cochrane Corporation, Philadelphia, Pa., a corporation of Pennsylvania Application May 24, 1932, Serial No. 613,211

9 Claims. (Cl. 261—23)

My present invention relates in general to liquid treating apparatus having two or more separate treating chambers and especially to mechanisms for controlling the distribution of the liquid to be treated to the individual chambers for the purpose of maintaining a uniform efficiency in all of the chambers and a proper division of the load therebetween.

My improved distribution mechanism is especially applicable to and was primarily devised for equalizing the distribution of water to two or more treating chambers of a boiler feed water heating and/or deaerating apparatus. Boiler feed water heating and/or deaerating capacity is frequently installed in two or more structurally separate units, all of the units being arranged to receive the water to be treated and the steam used in the treatment from the same sources.

In such a multi-unit heating apparatus, the separate water treating chambers are usually arranged to receive water from the same source through a common main and separate branch pipes. In apparatus of this character, the distribution of water to the respective heating chambers is highly important. If amounts of water supplied to two heating chambers of equal size are the same, the amounts of steam condensed and temperatures to which the water is heated in the respective chambers will be equal. The two chambers will thus equally divide the load on the apparatus. If, however, the water flows from a common source with little pressure drop to the two chambers and the vapor pressure in one of the chambers decreases, a greater amount of water will be drawn into that chamber, which effect will further lower the vapor pressure due to the corresponding increase in steam condensation and result in a further increase in the amount of water drawn in. The greater part of the load carried by the apparatus will thus be thrown on this chamber, resulting in a lowering of the temperature to which the water is heated in this chamber, and incomplete deaeration where the water is intended to be heated to a deaerating temperature, and in some cases a waste of steam from the chamber carrying the minor portion of the load or water hammer in the water supply connection thereto.

If the vapor pressure in one treating chamber increases, the amount of water drawn into that chamber will decrease, resulting in a further increase in vapor pressure. In this case, the other chamber will be forced to take on the greater portion of the load with the disadvantageous results mentioned above.

The maintenance of a balanced load condition between the treating chambers of a multi-unit installation thus depends upon an equal division of the water supply. If that can be maintained with reasonable accuracy, the problems of maintaining uniform vapor pressures and rates of flow of vent vapor will be substantially eliminated.

Various devices have been tried heretofore for dividing the water supply equally between the units of a multi-unit water treating installation. Such devices have usually been found to be impractical, either because of the difficulties experienced in maintaining the necessary pressure conditions in different parts of the apparatus or due to their inherent incapacity for successful operation with low water supply pressures or widely fluctuating load conditions.

The general object of my present invention is the provision of an improved liquid distribution mechanism for dividing an amount of liquid from a common source of supply between the chambers of a liquid receiving apparatus of the multiple unit type in a predetermined manner. A more specific object is to provide improved regulating mechanism for maintaining an equal distribution of the common water supply between the treating chambers of a water heating and/or deaerating apparatus of the multi-unit type irrespective of variations in the load. A further object is the provision of an improved construction of a single shell multi-chamber type of water deaerating heater, and which may be advantageously used in conjunction with my improved regulating mechanism to insure balanced load conditions between the treating chambers.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 1 is an elevation of boiler feed water heating, deaerating and storing apparatus embodying my invention;

Fig. 2 is an end view of the apparatus shown in Fig. 1 with parts broken away and in section;

Fig. 3 is a plan view of the deaerating heater shown in Figs. 1 and 2.

Fig. 4 is a plan view of a modified arrangement;

Fig. 5 is an enlarged view of a portion of the control provisions shown in Fig. 4;

Fig. 6 is a sectional view of the provisions shown in Fig. 5; and

Fig. 7 is a sectional elevation of a second modification.

In Figs. 1-3 of the drawings I have illustrated one preferred embodiment of my invention as applied to boiler feed water heating, deaerating and storing apparatus, which comprises broadly a deaerating heater A in which boiler feed water is adapted to be heated and deaerated, and a pair of storage tanks B and B' in communication with the heater A and arranged to receive the heated and deaerated water therefrom for delivery to one or more boiler feed pumps (not shown) as required to satisfy the pump demands.

In the apparatus shown, the heater A is of the cross-flow multi-compartment type and formed by a single horizontally elongated cylindrical shell A' having a pair of rounded end plates $A^2$ and divided into three heating compartments or chambers C', $C^2$, and $C^3$ of substantially equal volume by a pair of spaced partitions $C^4$. The partitions $C^4$ conform generally to the cross-section of, and are connected to the inner sides of the shell A'. At their lower ends, however, the partitions $C^4$ are cut away below the normal water level in the heating chambers to permit communication between the bodies of water in the bottoms of the otherwise separate chambers. The partitions $C^4$ are also cut away to accommodate the hereinafter mentioned steam chest or conduit D. Each of the heating chambers is provided with a water inlet pipe $C^5$, distributing box $C^6$, upper and lower tray stacks $C^7$, and a tray door $C^8$. The supply of heating steam is preferably delivered to the steam chest D which is formed by a bent upper baffle $D^2$ and a lower baffle $D^3$ connected to and extending along the inner side of the heater shell, through suitable steam supply pipes D' connected thereto at spaced points. A continuous rectangular opening $D^4$ is formed in the inner wall of the steam chest D for the full length of the shell opposite to the lower banks of trays $C^7$, as shown in Figs. 1 and 2. The steam flow through the tray banks in each chamber is conventionally indicated by the arrows in Fig. 2. An upper baffle $D^5$ extending between the tray bank and the shell confines the flow to the vent pipe hereinafter described, to a path through the upper tray bank.

The storage tanks B and B' are arranged below the heater A and connected to the heater water space by pipes $B^2$, as shown. Discharge pipes $B^3$ are provided in each storage tank for connection to the pump supply line. Pressure equalizing pipes $B^4$ connect the upper portions of the tanks B and B' to the vapor spaces of the heater chambers.

The general mode of operation of the apparatus described will be readily apparent to those skilled in the art. Water from a common source of supply connected to a main C is delivered to the heating chambers C', $C^2$ and $C^3$, through the branch inlet pipes $C^5$ arranged in parallel and overflows the distributing boxes $C^6$ onto the tray banks $C^7$. The tray banks may be of any well known construction which will cause the water to pass downwardly through the chambers in a finely divided form and in intimate contact with the steam, which will be drawn from the steam chest through the rectangular opening $D^4$. The water will be heated during its downward passage to within one or two degrees F. of the steam temperature and the air and other undesirable gases, which are separated from the water during its passage through the heater, will pass out with any uncondensed steam through vent pipes $C^{10}$. The heated and deaerated water collects in the bottom of the heater, from which it passes into the storage tanks B and B'.

In accordance with my present invention, the supply of water to the heater is divided between the several heater chambers in accordance with a fixed ratio, and that ratio maintained irrespective of fluctuations in the load or minor differences in vapor pressures in the chambers. In the present instance, provisions are made for dividing the water supply equally between the several chambers. The mechanism for this purpose includes the installation of a differential pressure creating device having a variable flow resistance in each of the supply branches $C^5$, preferably at a point adjacent the inlet to the corresponding heating chamber, and each having a capacity for creating a pressure drop considerably greater than the maximum pressure difference liable to occur between different chambers of the heater, together with mechanism for continuously maintaining a predetermined pressure drop in each of the branch pipes $C^5$. The specific regulating mechanism illustrated consists of a valve E in each branch pipe $C^5$ adjacent to the discharge end thereof. The valves E may be of any type which can be mechanically moved to regulate the effective flow area through that portion of the pipe, and are preferably of the piston type conventionally indicated in Fig. 2. The effective flow area of the valve port $E^{20}$ is variable by moving the port closing piston $E^{21}$ vertically by means of a valve stem $E^{22}$, which is operatively connected to a valve lever E', fulcrumed at $E^{23}$ and carrying at its opposite end an adjustable counter-weight $E^{24}$. The position of the counter-weights on the levers E' can be shifted by the operator to vary the effect on the regulating valves.

Each of the valve operating levers E' is operatively connected to a common rock shaft $E^2$ by a link $E^3$ and crank arm $E^4$. The shaft $E^2$ extends horizontally along the upper side of the heater A and its movements are effected and controlled by a weighted plunger $E^5$ movable vertically in a fluid pressure cylinder $E^6$. The plunger $E^5$ has its rod $E^7$ connected through a link $E^8$ and crank arm $E^9$ to the rock shaft $E^2$. The cylinder $E^6$ is arranged to receive at all times a motive fluid from a suitable high pressure source through a pipe line $E^{10}$, which includes a needle valve $E^{11}$ and one or more strainers $E^{12}$. If a plurality of strainers are used, they are advantageously arranged in parallel. The plunger is normally in such a position in the cylinder that the control valves E throttle the water flow to maintain a predetermined drop in pressure.

The motive fluid leaking past the valve $E^{11}$ normally escapes from the cylinder $E^6$, without changing the position of the plunger $E^5$, through a pipe F, in which a normally open control valve F" is positioned. The operation of the valve F" is automatically controlled by the variations in the pressure drop in one of the inlet pipes from its predetermined value. As shown, the stem $F^2$ of the valve F" has its upper end connected to a movable diaphragm G in a fluid-tight casing G'. The upper and lower sides of the diaphragm are subjected to the fluid pressures existing at the inlet and outlet sides of the valve E by means of pipes $G^2$ and $G^3$, respectively. A lever $F^3$ having a weight $F^4$ adjustably mounted thereon is connected to the valve stem $F^2$ to exert an opposition force on the valve stem equal to the desired normal pressure differential to be maintained through the valve E.

As long as the pressure drop through the valve E corresponds to the desired value, the valve $F''$ will remain open and the motive fluid can escape from the cylinder $E^6$ without shifting the position of the plunger. If, however, the pressure drop should increase due to an increase in flow sufficiently to over-balance the force exerted by the lever $F^3$ and weight $F^4$, the valve $F''$ will be partly or wholly closed, thereby restricting or preventing the escape of motive fluid from the cylinder $E^6$. The fluid pressure in the cylinder then builds up, raising the plunger and moving the rock shaft $E^2$ to cause the various valve levers $E'$ to move the valves towards their open positions. The differential due to the flow of water to each of the heating chambers will be thereby decreased to the predetermined normal. A drop in the water supply rate and thereby a fall in the pressure differential across the valve E will cause a further opening of the valve $F''$ allowing the motive fluid to escape more freely, with a consequent lowering of the plunger position and closing of the valves E. The closing movement of the valves E restores the pressure drop in the branch pipes to the desired value. The adjustable mounting of the lever weight $F^4$ permits the pressure differential which the control system maintains to be varied as desired.

The pressure in the main $C^9$ will always be greater than the pressure existing in the heating chambers by the differential set up at the valves E plus friction loss through the vent condensers and piping. The distribution of the water between the plurality of inlet pipes $C^5$ effected by the described control mechanism will therefore not be affected to any harmful extent by the slight fluctuations in pressure which may occur in the heating chambers since such fluctuations will be only a small fraction of the pressure drop normally maintained.

The regulating provisions described may be superseded during emergency periods by auxiliary provisions which regulate the operation of the valves E in accordance with the demands on the apparatus as indicated by changes in water level in the storage tanks B and B'. For this purpose, high and low level float control mechanisms H and L, respectively, are provided and arranged to automatically operate in controlling the pressure in the cylinder $E^6$.

In the construction shown, the mechanism L comprises a float box L' connected by pipes $L^2$ and $L^3$ and T's $L^7$ to each of the storage tanks, whereby the liquid level in the box L' will correspond to that in the storage tanks whenever the level in the latter rises above the point of connection of the pipe $L^2$. A pivoted float $L^4$ in the box L' is connected through a linkage $L^5$ and counterweighted lever $L^6$ to the valve stem K' of a normally open cut-off valve K positioned in the pipe line F between the valve $F''$ and the cylinder $E^6$. Float control mechanisms of this type are well known and render a more specific description of the construction unnecessary. The control float $L^4$ and valve mechanism are so arranged that when the liquid level in the storage tanks falls to a dangerously low level, the valve K will be moved from its normally open position to a position in which it is closed or substantially closed, whereby the flow of motive fluid from the cylinder $E^6$ will be restricted, subsequently raising the plunger $E^5$ and moving the regulating valves E to their fully open positions to freely admit any water available into the heater chambers. The low level control mechanism will be restored to its normal condition, in which the valve K is open, on the resultant increase in water level in the storage tanks.

The high level control mechanism H is substantially similar in construction to the mechanism L. The mechanism H includes a control float $H^4$ and a float box H', the water level in which corresponds to the water level in the storage tanks by means of the pipes $H^2$ and $H^3$ and T's $H^7$. On the occurrence of an undesirably high water level in the storage tanks, the float $H^4$ will rise to the upper position indicated to move a cut-off valve M from a normally closed position in an independent discharge line J to a fully open position by means of a link $H^5$, lever $H^6$ and valve stem M'. The discharge pipe J is connected to the pipe line F between the valve $F''$ and the cylinder $E^6$. Irrespective of the position of the valve $F'$, the opening of the valve M will cause the plunger $E^5$ to move downwardly, close the valves E and thereby cut off the supply of water to the heating chambers until the water level in the storage tank drops sufficiently to restore the float $H^4$ to its normal position.

A deaerating heater of the specific construction illustrated in the drawings has certain practical advantages in regard to water distribution over an open deaerating heater of the same size and containing the same amount of tray surface, but without the chamber-forming partitions $C^4$, the separate water boxes $C^6$, or the venting provisions hereinafter described. For example, in a single chamber heater twenty or more feet in length and having its water overflow box running substantially the full length of the heater, it is extremely difficult to so arrange the steam supply connections that a pressure difference will not exist between the opposite ends of the chamber. Even a slight pressure differential is sufficient to vary the overflow of water from the box in the different portions of the chamber and thereby further disturb the pressure conditions therein. The present division of the chamber into three chambers of substantially equal size and containing substantially equal amounts of tray surface, together with the provisions for equalizing the distribution of water considerably decrease this tendency towards pressure differences.

The tendency towards the creation of a pressure difference between different parts of the heater is enhanced by any difference in the rates of flow of vent vapor from the different portions of the heater. The separate heating chamber formation decreases this tendency. I also provide separate venting apparatus for each chamber comprising vent condensers N', $N^2$ and $N^3$ of any suitable form for the heating chambers C', $C^2$ and $C^3$, respectively. The vent condensers are preferably of equal size and when incorporated in the corresponding inlet pipes $C^5$ and employed with the control apparatus heretofore described, will have equal condensing capacities, and thereby effect equal rates of flow of vent vapor from the various heating chambers.

In the modification illustrated in Figs. 4-6 I have illustrated my invention as adapted for the water supply control provisions for a pair of structurally separate water deaerating heaters O, each of which contains two tray sections O' and O² separately receiving water to be treated. In carrying out my invention, it is necessary to divide the water from the supply main P equally between the heaters and also between the two sections of each heater. The heaters O may be of the same general type as that heretofore described, each heater having a steam supply pipe O³ delivering steam to both sections of the heater. The heater sections O' and O² are respectively provided with water supply pipes Q' and Q², vent condensers Q³ and Q⁴, off-take pipes Q⁵ and Q⁶ leading to the corresponding vent condensers, and water inlet pipes Q⁷ and Q⁸ having divided inlets Q⁹ and Q¹⁰ to the interior of the heater. The conduit connections to the supply pipes Q' and Q² of each heater from the water main P consist of a T P', the outlets of which are connected to two dividing fittings R by pipes P². Each fitting is in the form of a T, to the outlets R' of which one supply pipe for each heater is connected.

As shown in Figs. 5 and 6 between each outlet R' and the inlet to each fitting R is a port provided with a valve seat member S' and a controlling valve member S of disc form. The valves S and valve seat members S' are all similar in construction and mode of operation. Each valve seat member S' has at its outlet side a cylindrical skirt like extension surrounding the corresponding valve disc S and formed with a series of tapered outlet notches or orifices S² which collectively provide the discharge port area through which water is discharged when the valve member is not in its closed position owing to the elongated form of said notches S² by the effective discharge area progressively increases with the movement of each valve member S through a considerable distance away from its fully closed position. Each valve disc S is axially slideable on a valve stem S³, which is connected at its inner end to a pair of curved links S⁴. The links S³ for the two valves have their opposite ends connected to the opposite ends of a lever S⁵ secured to a shaft S⁶, which is arranged to extend laterally through the wall of the fitting, as shown in Fig. 6. The fitting wall opening is rendered fluid-tight and the shaft supported by a stuffing box S⁷. Externally of the fittings, each shaft S⁶ carries a lever S⁸ connected through a link S⁹ to a lever T' carried by a horizontal rock shaft T, which thus ties the four valves together for synchronous movements. One or more levers T² carrying adjustable counterweights T³ are mounted on the shaft T and provide a common yielding loading force opposing the tendency of the water pressure to open the valves, and thus create a predetermined drop in fluid pressure across each valve.

In operation, water to be treated normally flows from the T P' to each of the fittings R and passes the valves S to the heater sections in equal amounts. If for any cause, a greater amount of water tends to pass from the T P' to one of the fittings R than to the other, the valves in the former tend to open to accommodate the increased flow and restore the pressure drop to its original value, but this opening tendency is opposed by the tendency of the other pair of valves to close. The shaft T will normally be maintained thus by the opposing forces in a position of equilibrium in which the pressure drops across all of the valves S have the same normal value and the flow is equally divided between the different fitting outlets. The described arrangement of the tapered outlet notches or orifices S² contributes to the accuracy of the control and the desired uniformity of water flow through the ports controlled by the different valve discs S'.

The slideable arrangement and mounting of the valves S permit their use as independent check valves on any abnormal change in pressure conditions on their outlet sides. Each valve can return to its seat independently of the position of the others whenever the pressure on its outlet side increases above that on its inlet side. While during such intervals the water control system is rendered ineffective, the avoidance of back flow of steam into the water supply line and thereby water hammer is advantageous.

In Fig. 7, I have shown another form of regulating valve for dividing the water supply between two heaters or between two sections of the same heater. The valve body U is provided with a water inlet U' and separate outlets U² and U³ leading to the receptacles receiving the water. The inlet compartment U⁴ is formed by a globular partition U⁵ having aligned upper and lower ports U⁶ and U⁷, respectively, controlled by a vertically movable valve sleeve V. When the sleeve is in the position shown in Fig. 7, the ports U⁶ and U⁷ are closed by transverse walls V' and V², respectively extending across the interior of the sleeve at the levels of the ports U⁶ and U⁷. Similar portions of the sleeve immediately below the walls V' and V² are formed with duplicate series of valve ports V³, the ports in each series being in vertical alignment with the ports in the other series, so that as the sleeve is raised, the port discharge areas to the separate outlets will always be the same irrespective of the distance the valve sleeve is raised. The upper end of the sleeve is connected to a valve stem V⁴, which passes through a stuffing box V⁵ in the valve bonnet and is connected to suitable operating mechanism, such as the conventionally illustrated control float V⁶.

In operation, the full pressure of the water supply in the common main will act on both series of valve ports V³ and the pressure drops therethrough will be substantial as compared to any normal variation in fluid pressures in the receptacles to which the ports U² and U³ are connected. Due to the similar shape, size and arrangement of the upper and lower series of ports, the effective discharge areas to the connected conduits will be the same in all positions of the sleeve and the water supply will be equally divided between the heater sections, or heaters, at all loads. In use, the control float is preferably responsive to the amount of water being supplied to the valve.

It will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. Liquid treating apparatus comprising in combination, a plurality of liquid treating chambers, a common source of liquid for all of said chambers, a separate pipe connection from said source to each of said chambers, differential pressure creating device in each of said pipe connections, a storage tank arranged to receive the treated liquid, means for simultaneously regulating the flow controlling action of said devices in accordance with variations in the rate of flow of liquid to one of said chambers, and means for varying the action of said last mentioned means in accordance with changes in liquid level in said storage tank.

2. Liquid treating apparatus comprising in combination, a plurality of liquid treating chambers, a common source of liquid for all of said chambers, a separate pipe connection from said source to each of said chambers, a flow regulating valve in each of said pipe connections, a storage tank arranged to receive the treated liquid, means for simultaneously regulating the action of said valves in accordance with variations in the rate of flow of liquid to one of said chambers, and means for varying the action of said last mentioned means in accordance with changes in liquid level in said storage tank.

3. Water heating apparatus comprising in combination, a plurality of water heating chambers having separate water inlet pipes, a common supply main connected to said pipes, a common steam supply connection to each of said chambers, a variable control device in each of said inlet pipes for regulating the supply of water to the corresponding heating chamber, and automatically operating means including means responsive to the rate of flow of water to one of said chambers for simultaneously effecting similar adjustments of each of said control devices in accordance with variations in said rate of flow from a predetermined normal value.

4. Water heating apparatus comprising in combination, a plurality of heating chambers having separate water inlet pipes, a common supply main connected to said pipes, a common steam supply connection to each of said chambers, a pressure differential creating control device in each of said inlet pipes for regulating the supply of water to the corresponding heating chamber, and automatically operating means for simultaneously effecting similar adjustments of each of said control devices in accordance with the variations in pressure drop through one of said devices from a predetermined normal value.

5. Water heating apparatus comprising in combination, a plurality of heating chambers having separate water inlet pipes, a common supply main connected to said pipes, a common steam supply connection to said chambers, a control valve in each of said inlet pipes for regulating the supply of water to the corresponding heating chamber, means for measuring the pressure drop through one of said control valves, automatically operating means for simultaneously effecting similar flow controlling adjustments of each of said control valves in accordance with variations in the pressure drop through said control valve from a predetermined value, and means for varying the effect of said last mentioned means in accordance with changes in demand on said apparatus.

6. Water heating and deaerating apparatus comprising in combination, a plurality of heating chambers having separate water inlet pipes, a common supply main for said pipes, a common steam supply for said chambers, a control valve in each of said inlet pipes for regulating the amount of water passing to the corresponding heating chamber, a rock shaft for simultaneously operating all of said control valves, fluid pressure operated means for actuating said rock shaft, a source of motive fluid connected to said means, a valve for controlling the action of said motive fluid on said means, and means for operating said valve in accordance with changes in the pressure differential across one of said control valves from a predetermined normal value.

7. Water heating and deaerating apparatus comprising in combination, a plurality of heating chambers having separate water inlet pipes, a common supply main for said pipes, a common steam supply connection for said chambers, a control valve in each of said inlet pipes for regulating the amount of water passing to the corresponding heating chamber, a rock shaft for simultaneously operating all of said control valves, fluid pressure operated means for actuating said rock shaft, a source of motive fluid connected to said means, a valve for controlling the action of said motive fluid on said means, a storage tank arranged to receive the heated and deaerated water from said chambers, means for operating said valve in accordance with changes in the pressure differential across one of said control valves from a predetermined normal value, and supplemental control means responsive to changes in liquid level in said storage tank for effecting a control action on said fluid pressure operated means.

8. The combination with a plurality of receptacles adapted to receive a liquid from a common source of supply and subject to internal pressure variations, of means for maintaining an equal division of the supply of liquid between said receptacles comprising a conduit connection from said source to each of said receptacles, said conduit connections being arranged in parallel, a flow controlling device for controlling the flow through each of said conduit connections, means associated with said device for effecting a pressure drop in each of said conduit connections which is substantial as compared to the value of the normal pressure variations in said receptacles, and means for simultaneously adjusting said devices to thereby regulate the flow through each of said conduit connections in accordance with the variations in value of the pressure drop in one of said conduit connections from a predetermined value.

9. The combination with a plurality of receptacles adapted to receive a liquid from a common source of supply and subject to internal pressure variations, of means for maintaining an equal division of the supply of liquid between said receptacles comprising a conduit connection from said source to each of said receptacles, said conduit connections being arranged in parallel, a flow controlling device for controlling the flow through each of said conduit connections comprising separate series of similar valve ports arranged to separately discharge to said receptacles, said device being arranged to effect a pressure drop in each of said conduit connections which is substantial as compared to the value of the pressure variation in said receptacles, and means responsive to the said pressure drop in one of said conduits for similarly and simultaneously regulating the flow through all of said valve ports.

VICTOR A. ROHLIN.